United States Patent [19]
Kinlen

[11] Patent Number: 5,863,465
[45] Date of Patent: *Jan. 26, 1999

[54] EMULSION-POLYMERIZATION PROCESS AND ELECTRICALLY-CONDUCTIVE POLYANILINE SALTS

[75] Inventor: Patrick J. Kinlen, Fenton, Mo.

[73] Assignee: Monsanto Company, St. Louis, Mo.

[*] Notice: The term of this patent shall not extend beyond the expiration date of Pat. No. 5,567,356.

[21] Appl. No.: 596,202

[22] PCT Filed: Nov. 7, 1995

[86] PCT No.: PCT/US95/14610

§ 371 Date: Feb. 16, 1996

§ 102(e) Date: Feb. 16, 1996

[87] PCT Pub. No.: WO96/14343

PCT Pub. Date: May 17, 1996

Related U.S. Application Data

[63] Continuation-in-part of Ser. No. 335,143, Nov. 7, 1994, Pat. No. 5,567,356.

[51] Int. Cl.$^6$ ............... H01B 1/00; H01B 1/06; H01B 1/12

[52] U.S. Cl. ............. 252/500; 252/518; 524/86; 524/457; 528/210; 528/212; 528/214

[58] Field of Search .................. 252/500, 518; 524/86, 457; 528/210, 212, 214

[56] References Cited

U.S. PATENT DOCUMENTS 5,567,356  10/1996  Kinlen .................... 252/500

*Primary Examiner*—Paul Lieberman
*Assistant Examiner*—Gregory R. Delcotto
*Attorney, Agent, or Firm*—Howell & Haferkamp, L.C.

[57] ABSTRACT

Emulsion-polymerization of electrically conductive polyaniline salts is disclosed. The process comprises combining water, a water-solubilizing organic solvent, an organic acid that is soluble in the organic solvent, an aniline monomer, and a radical initiator. An organic phase forms which contains the polyaniline salt of the organic acid wherein the organic phase is separable from an aqueous phase. The polyaniline salt so formed is soluble in organic carrier solvents at a concentration of 25 w/w % or greater.

10 Claims, 2 Drawing Sheets

EMULSION-POLYMERIZATION PROCESS AND ELECTRICALLY-CONDUCTIVE POLYANILINE SALTS

This application is a continuation-in-part of Ser. No. 08/335,143, filed on Nov. 7, 1994, now U.S. Pat. No. 5,567,356.

BACKGROUND OF THE INVENTION

(1) Field of the Invention

The present invention relates to an emulsion-polymerization process and to processible, electrically conductive polyaniline salts, and more particularly to an emulsion-polymerization process for producing a polyaniline salt of an organic acid wherein the polyaniline salt is soluble in organic carrier solvents.

(2) Description of the Prior Art

Polyaniline is recognized as being chemically stable and electrically conductive in the protonated form. Nevertheless, use of polyaniline has been limited because it has been considered intractable or unprocessible.

Synthesis of polyaniline is commonly performed by the method of chemical oxidative polymerization based upon an aqueous solution polymerization system. (see Cao et al., *Polymer,* 30:2305, 1989). This method involves combining water, a protonic acid, aniline and an oxidizing agent and allowing the mixture to react while maintaining the reaction mixture at constant temperature. After a period of several hours, the precipitated polyaniline is separated from the reaction mixture and washed. Material synthesized by this approach is insoluble in organic solvents and predominantly amorphous. (Annis et al., *Synth. Met.* 22:191 et seq., 1986).

A second step after polymerization has been utilized to improve processibility consisting of doping the polyaniline to the conducting form with acids and dissolving in organic solvents. Tzou and Gregory (*Synth. Met.,* 53:365f–377, 1993) used this approach and reported that polyaniline salts containing carboxyl and amino substituents were soluble in the polar solvents, N-methyl-2-pyrrolidinone and dimethylsulfoxide. In contrast, in the same solvents the polyaniline salts of dodecylbenzenesulfonic acid, 1,5-naphthalenedisulfonic acid and p-toluenesulfonic acid were insoluble or were unstable and precipitated.

Cao et al. reported on use of this method to prepare polyaniline salts of a number of protonic acids including 4-dodecylbenzene sulfonic acid and dinonylnaphthalene sulfonic acid. (Cao et al., *Synthetic Metals* 48:91–97, 1993; Cao et al., U.S. Pat. No. 5,232,631, 1993). The polyaniline salts were reported to be soluble in nonpolar solvents such as xylene, however, the solubility appeared to be very low. For example the maximal solubility of the dodecylbenzene-sulfonic acid salt of polyaniline was less than 0.5%.

In one variation of this process, the polyaniline was doped with one material predominantly at core of the particles and with a second material predominantly at the surface. The surface dopants were identified to be a number of possible protonic acids including dinonylnaphthalenesulfonic acid. (Shacklette et al., U.S. Pat. No. 5,281,363). It is disclosed that use of the surface dopant is to achieve increased compatibility between the conductive polymer particles dispersed in a matrix polymer of lower surface energy and lesser polar character.

Emulsion polymerization processes for preparing a polyaniline salt of a protonic acid have been reported. (Cao et al., U.S. Pat. No. 5,232,631, Example 6B, 1993; Cao and Jan-Erik, WO94/03528, 1994 I; Cao and Jan-Erik, U.S. Pat. No. 5,324,453, 1994 II; see also, Osterholm et al., P. Synth Met 55:1034–9, 1993). In these disclosures aniline, a protonic acid, and an oxidant were combined with a mixture of a polar liquid, typically water, and a non-polar or weakly polar liquid, e.g. xylene, chloroform, toluene, decahydronaphthalene and 1,2,4-trichlorobenzene, all of which are either sparingly soluble or insoluble in water. There was, however, no disclosure in the examples of the use of any non-polar or weakly-polar liquid having a solubility in water greater than one part in 200 parts water. Furthermore, because this group used organic solvents that were insoluble in water, the protonic acid was required to have substantial emulsifying properties. Moreover, the solvents used by this group are considered hazardous materials such that the polyaniline formed could not be used in coatings, finishes, paints, inks and the like, or in blends with other components without first separating the polyaniline from the solvent.

SUMMARY OF THE INVENTION

Briefly, therefore, the present invention is directed to a novel emulsion-polymerization process for the production of a polyaniline salt that has an unexpectedly high solubility in organic solvents. The process comprises mixing water, a water-solubilizing organic polymerization solvent, an organic acid that is soluble in said organic solvent, and a radical initiator. The mixture forms an organic phase containing a polyaniline salt of the organic acid. The polyaniline salt so prepared is soluble in carrier organic solvents and is, as a result, processible.

The present invention is also directed to a composition comprising an electrically-conductive polyaniline salt of an organic acid wherein the polyaniline salt is soluble in xylene at a concentration equal to or greater than about 25% by weight. The polyaniline salt is also soluble in other carrier organic solvents having a dielectric constant less than about 17. Preferably, the polyaniline salt has a molecular weight of at least about 4000 and the composition is substantially free of particles of a diameter greater than approximately 0.2 microns.

The present invention is further directed to a polyaniline salt composition comprising a solution of the polyaniline salt in a nonaqueous organic carrier solvent.

The present invention is also directed to a composition comprising an emulsion containing water, a water-solubilizing organic solvent in which the water solubility is about 6% (w/w) or greater, and the polyaniline salt.

The present invention is also directed to a polyaniline salt composition capable of forming a film on a substrate.

The present invention is also directed to a polyaniline salt composition capable of forming a blend of the polyaniline salt composition with a thermosetting or a thermoplastic resin.

Among the several advantages found to be achieved by the present invention, therefore, may be noted the provision of an electrically-conductive polyaniline salt that is soluble in nonaqueous organic solvents and thereby processible; the provision of a method for producing an electrically-conductive polyaniline salt that is readily processible; the provision of an electrically-conductive polyaniline salt composition capable of forming a film when applied to a substrate; and the provision an electrically-conductive polyaniline salt composition capable of forming a blend with a thermosetting or thermoplastic resin.

DETAILED DESCRIPTION OF THE PREFERRED EMBODIMENTS

Figure 1:
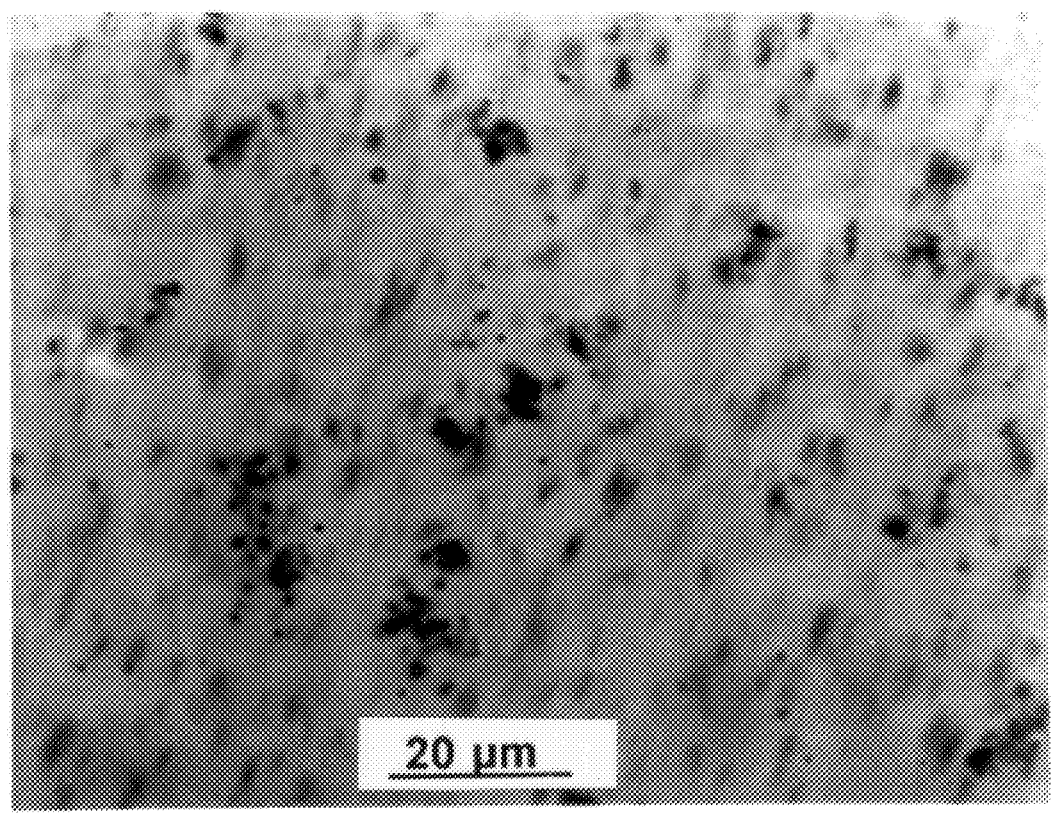
FIG. 1 consists of light micrographs at approximately 800× magnification showing (a) the particulate nature of the sample of polyaniline salt of dinonylnaphthalenesulfonic acid prepared by neutralizing and redoping a commercially-obtained polyaniline salt and (b) the absence of detectable particles in the sample of polyaniline salt of dinonylnaphthalenesulfonic acid prepared by emulsion-polymerization according to this invention.
Figure 1:
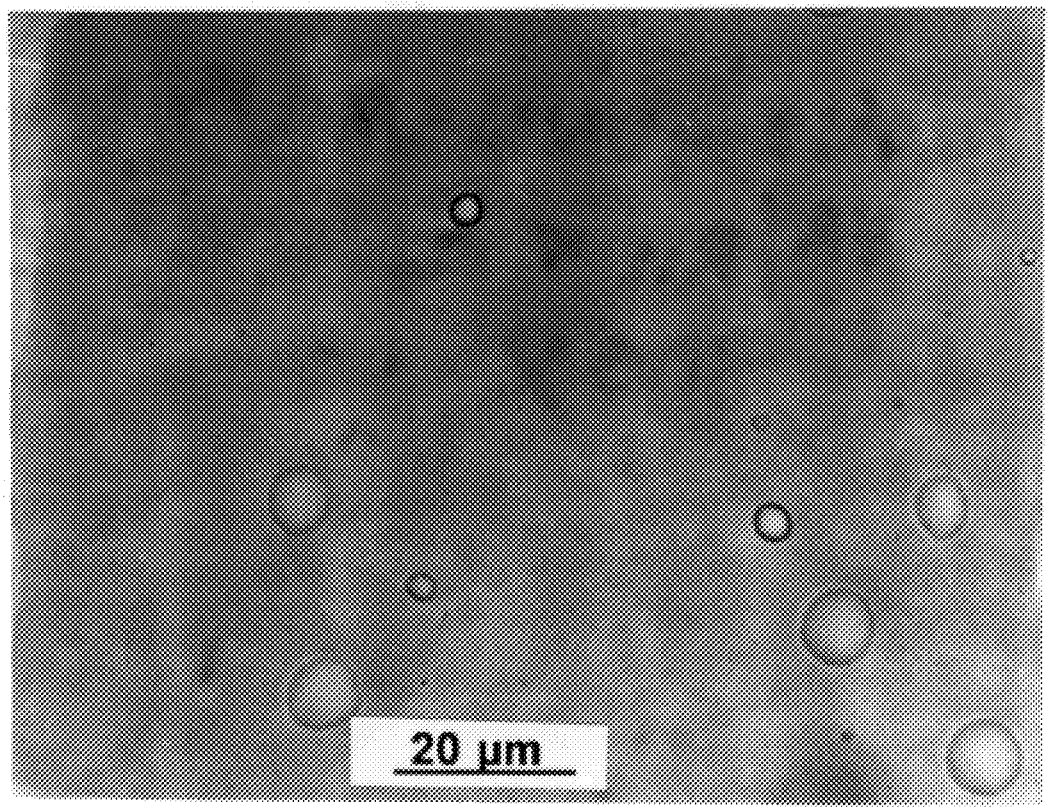

In accordance with the present invention, it has been discovered that upon combining water, a water-solubilizing organic polymerization solvent, an organic acid soluble in said organic solvent, aniline, and a radical initiator, a polyaniline salt is produced. Surprisingly, the polyaniline salt is soluble in organic carrier solvents such as xylene at a concentration equal to or greater than about 25% by weight. The polyaniline salt is soluble in other carrier organic solvents having a dielectric constant less than about 17. As a result, the polyaniline salt is readily processible. This is in contrast to polyaniline compositions made by conventional aqueous polymerization and emulsion-polymerization techniques in which the polyaniline is either insoluble or sparingly soluble in carrier organic solvents. Such compositions are either unprocessible or are limited in processibility due to the low solubility in the organic carrier solvents.

The emulsion-polymerization process of the present invention uses an organic solvent in which water is soluble at about 6% w/w or greater. Surprisingly, this facilitates polymerization of polyaniline salts of organic acids, and, in particular, polyaniline salts of organic acids that are insoluble in water such as dinonylnaphthalenesulfonic acid. In contrast, use of a organic polymerization solvent in which water is not soluble such as xylene with an aqueous phase along with the same acid, aniline and radical initiator results in no polyaniline formation.

The polyaniline salt made by the method in this invention is electrically conductive as synthesized and need not be further processed by dissolving in acid. The polyaniline can be used in films and coatings on various substrates.

The general process of emulsion polymerization is well known in the art (for example, see *Textbook of Polymer Science by Billmeyer, Jr. F. W.*, New York, 1984). In brief, the present emulsion-polymerization process utilizes two liquid phases, a polar phase and a phase produced by a non-polar or weakly polar liquid. One of the phases is continuous whereas the other is discontinuous in either an emulsion (aqueous phase continuous and organic phase discontinuous) or inverse emulsion system (aqueous phase discontinuous and organic phase continuous). The organic acid, which provides the counterion for the polyaniline salt being synthesized is soluble in the water-solubilizing organic solvent. The mixture of water, water-solubilizing organic solvent, organic acid soluble in said organic solvent, aniline and radical initiator form the emulsion.

The aniline monomer used in the present invention can be a substituted or unsubstituted aniline of the formula:

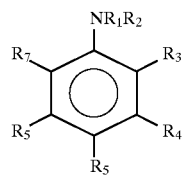

wherein $R_1$ is hydrogen and $R_2$ is hydrogen or alkyl; and $R_3$–$R_7$ are, independently, hydrogen, alkyl, arylalkyl, alkaryl, hydroxy, alkyloxy, halogen or nitro. In the aniline preferred in the present invention $R_1$–$R_7$ are hydrogen.

The aqueous phase in the starting emulsion system consists of from about 0.2 to about 10 liters of water per mole of aniline, preferably from about 0.5 to about 4 liters of water per mole of aniline and most preferably from about 1 to about 2 liters of water per mole of aniline. The water-solubilizing organic polymerization solvent is added in an amount to obtain from about 50 grams to about 1600 grams of organic solvent per mole of aniline, preferably from about 100 grams to about 800 grams of organic solvent per mole of aniline and most preferably from about 200 to about 400 grams of organic solvent per mole of aniline.

The organic polymerization solvent is capable of solubilizing water from about 6 grams water in about 100 grams solvent: (6 w/w %) to being miscible with water. Although one can use a wide variety of organic polymerization solvents in which water is soluble at about 6% w/w or greater, preferred organic polymerization solvents are also capable of solubilizing the polyaniline as it is formed. This is thought to facilitate formation of the polyaniline which could otherwise precipitate in relatively short and low molecular weight chains. Characteristics of the organic polymerization solvent that permit solubilization of the polyaniline in the polymerization solvent are those identified below in the description of the polyaniline carrier solvent. In particular, preferred organic polymerization solvents have a dielectric constant less than about 17.

Organic solvents such as isopropanol solubilize water but do not readily solubilize the synthesized polyaniline salt (see Table 2 below) and as a result the polymerized polyaniline salt precipitates as it is forming. On the other hand, organic solvents such as xylene or chloroform do not readily solubilize water but do solubilize the synthesized polyaniline salt and as a result no polyaniline salt is polymerized using these solvents. Thus, preferred organic polymerization solvents are capable of solubilizing water as well as solubilizing the polyaniline salt as it is formed. Such organic solvents useful in the present invention include but are not limited to 2-butoxyethanol, propylene glycol butyl ether, 1-butanol, 1-hexanol and diethyl ether. Especially preferred is 2-butoxyethanol. The organic polymerization solvents identified above are merely representative exemplifications and the solvent used can be selected broadly from solvents meeting the criteria above.

Organic acids useful in the present invention are soluble in the organic polymerization solvent. Any suitable organic acid can be used so long as it is soluble in the organic solvent. Once selecting an organic solvent according to the criteria above, the skilled artisan can readily determine whether a particular organic acid is soluble in the organic polymerization solvent. Organic acids that can be used in the polymerization process include but are not limited to organic sulfonic acids, organic phosphorus-containing acids, carboxylic acids, or mixtures thereof. Preferred organic sulfonic acids are dodecylbenzene sulfonic acid, dinonylnaphthalenesulfonic acid, dinonylnaphthalenedisulfonic acid, p-toluene sulfonic acid, or mixtures thereof. Most preferred is dinonylnaphthalenesulfonic acid. The ratio of moles of the organic acid to moles of aniline is from about 1:0.3 to about 1:10, preferably from about 1:0.6 to about 1:4 and most preferred a ratio of 1:2.

Radical initiators for chemical polymerization of aniline are well known in the art. (For example, see Cao et al. *Polymer*, 30:2305–2311, 1989). The radical initiator can be any of a number of oxidizing agents including ammonium persulfate, potassium dichromate, potassium iodate, ferric chloride, potassium permanganate, potassium bromate or potassium chlorate. The preferred radical initiator of the present invention is ammonium persulfate. The ratio of moles of aniline to moles of radical initiator is from about 0.2 to about 10.0, preferably from about 0.8 to about 5.0 and most preferably about 2.7.

The polymerization of aniline according to the present invention is an exothermic reaction. It is, therefore, desirable that the mixture be stirred and that the reaction temperature be regulated. Methods for stirring a reaction vessel and for regulating temperature in a reaction vessel are well known in the art. A preferred temperature for the reaction system is 5° C. The reaction is allowed to proceed to completion, at least until the emulsion separates into two immiscible phases, typically about 17 hours.

Both the water-solubilizing organic polymerization solvent and the organic acid influence the emulsion-polymerization process and the polyaniline salt ultimately synthesized. The organic acid need have only modest surfactant properties in order to produce the polyaniline salt when water-solubilizing organic solvents such as 2-butoxyethanol were used. This was the case with the polyaniline salt of dinonylnaphthalenesulfonic acid, which is soluble in organic solvent, 2-butoxythethanol, but insoluble in water. In contrast, no polyaniline salt could be produced when the hydrophobic organic solvent, xylene, was used with the same acid. This indicates that the emulsion-polymerization process requires a water-solubilizing organic solvent in particular for organic acids such as dinonylnaphthalenesulfonic acid that are soluble in the organic solvent but insoluble in water. Although the present invention is not limited to a particular mechanism of action, one possible explanation for the lack of polymerization with xylene is that the ammonium persulfate remains in the aqueous phase and is unable to partition into the organic xylene phase in which the aniline is thought to reside. As a result, polymerization does not occur. Thus a water-solubilizing organic solvent phase is required for the emulsion-polymerization of aniline with a water-insoluble organic acid such as dinonylnaphthalenesulfonic acid because the aniline, organic acid and water-soluble radical initiator are all thought to solubilize in the organic phase when using a water-solubilizing organic solvent.

Three types of polyaniline products were produced when hydrophilic organic polymerization solvents were used, depending upon both the solvent and the organic acid used. The polyaniline synthesized in some cases was soluble in the organic phase, in other cases a precipitate formed which was insoluble in either the organic phase or water, while in others the polyaniline remained in an emulsion from which the polyaniline could be precipitated.

The polyaniline salt can be isolated from the reaction mixture by several means depending on whether the final product is a solution, emulsion or precipitate. In the first two cases, polyaniline salt within an organic phase can be removed and washed with water. A polyaniline salt solution or emulsion can be use directly as formed. The polyaniline salt can also be precipitated by addition of acetone and, subsequently, the precipitate can be washed with water. In the case where the emulsion-polymerization product is a precipitate, the polyaniline salt can be washed with water.

A solution in the organic phase was formed when the organic acid was dinonylnaphthalenesulfonic acid and the organic solvent was 2-butoxyethanol. Because this polyaniline salt was soluble on synthesis, it could be used directly as synthesized without further processing. A solution was also formed with the same acid and the organic solvent, propylene glycol butyl ether.

When the organic acid was p-toluene sulfonic acid and the organic solvent was 2-butoxyethanol, the polyaniline salt thus formed was a precipitate that was insoluble in the organic phase. This material was not processable as polymerized and would require further processing. Thus, using the solvent 2-butoxyethanol, the difference in organic acid determined whether the resultant polyaniline salt would be soluble and processable. The water-soluble acid, p-toluene sulfonic acid, produced an insoluble polyaniline salt, but the water-insoluble acid, dinonylnaphthalenesulfonic acid, produced a polyaniline salt which was soluble in the organic phase.

A precipitate was also formed when the organic acid was dinonylnaphthalenedisulfonic acid and the solvent was isobutanol.

An emulsion was formed when the organic acid was dodecylbenzenesulfonic acid and the solvent was either isopropanol or 2-butoxyethanol.

Template synthesis of polyaniline can also be performed with the emulsion-polymerization process using high molecular weight perfluorosulfonate polymers as the anionic polymeric template and 2-butoxyethanol as the organic solvent. One such perfluorosulfonate polymer is the copolymer of tetrafluoroethylene and perfluoro 3,6-dioxa-4-methyl-7-octene sulfonylfluoride in the hydrolyzed $H^+$ form having an equivalent weight of 1100 which is sold under the trademark "Nafion®" (E.I. DuPont DeNemours & Company). The polyaniline produced using these substituents formed a solution from which the polyaniline salt complex could be precipitated on addition of excess water.

The polyaniline salt of the present invention can, thus, be in the form of a solution, an emulsion or a precipitate prepared by the emulsion-polymerization process.

The molecular weight of the polyaniline salt of the present invention is at least about 2000 and preferably at least about 4000 and most preferably at least about 10,000. Furthermore, the polyaniline salt is readily filterable through an ultrafilter having a 0.2 micron diameter pore size. Thus, the polyaniline salt composition of the present invention is greater than approximately 95% percent free of particles having a diameter greater than 0.2 microns.

One of the characteristics of the polyaniline salt of the present invention is that it is soluble in xylene as well as in other suitable organic carrier solvents at high concentrations. The preferred polyaniline salt compositions of the present invention are soluble to the extent of at least about 25% or greater in xylene or other carrier solvent. Also included within the scope of this invention are compositions in which the polyaniline salt is capable of being solubilized in xylene or other carrier solvent at concentrations of from about 5% to about 40%, i.e. at concentrations of at least about 5%, at least about 10%, at least about 15%, at least about 20%, at least about 30%, at least about 35% and at least about 40% on a w/w % basis.

It will be readily appreciated by one skilled in the art that organic carrier solvents other than xylene can also be used to form the solubilized polyaniline salt composition of the present invention. The carrier solvent is one in which the polyaniline salt is substantially soluble and one which will allow the polyaniline to be utilized, for example, to form a film on a suitable surface or a composite with a second polymer. The carrier solvent is a nonaqueous organic solvent having a dielectric constant less than about 17. Typical carrier solvents include xylene, toluene, 4-methyl-2-pentanone, trichloroethylene, butylacetate, 2-butoxyethanol, n-decyl alcohol, chloroform, hexanes, cyclohexane, 1-pentanol, 1-butanol, 1-octanol, 1,4 dioxane, cyclohexane, and m-cresol. Mixed solvents can also be used as well. As noted above, the polyaniline salt of the present invention is soluble in these solvents at a concentration equal to or greater than 5% to about 40% and preferably equal to or greater than about 30%. The carrier solvents given above are merely representative exemplifications and carrier solvents can be selected broadly from materials meeting the criteria set forth above.

Once prepared by the emulsion-polymerization process of the present invention, the polyaniline salt solubilized in the organic phase can by further processed by adding xylene and washing the organic phase with water. The solution is then vacuum evaporated under the reduced pressure of a water tap aspirator. Using the polyaniline salt of dinonylnaphthalenesulfonic acid prepared from the organic solvent 2-butoxyethanol, the resultant composition contains from about 35% to about 45% xylene, from about 15% to about 25% 2-butoxyethanol and from about 25% to about 35% w/w polyaniline salt.

The compositions of the present invention is capable of direct application to the surface of a substrate such as metal, glass or plastic. The polyaniline salt can be dissolved in a suitable carrier solvent and applied to a substrate by any conventional method of application such as spraying or application by brush or by electrophoretic coating. If application is from a solvent vehicle, the solvent can be removed by air drying.

The soluble polyaniline salt can also be added to a coating matrix made up of another polymer and the mixture applied to a substrate. In addition, the polyaniline salt may be applied as a first coating, e.g., a primer under a top coat.

When applied to a substrate, the coating is not removed in a standard adhesion test. One such test is ASTM Test No. D3359, which generally involves scribing an "X" or a series of cross-hatches in the layer of coating to expose the bare metal, applying adhesive tape to the scribed portion, removing the adhesive and observing if any of the coating layer is removed and comparing the amount of coating that is removed to a standard classification table for the adhesion test as designated in ASTM Test No. D3359 or other adhesion test accepted by the coatings industry.

Among metals that can serve as substrates for coating with the polyaniline salt of the present invention are iron, steel, copper, aluminum, nickel, zinc, cobalt, lead, chromium, tantalum, titanium, zirconium, silver, niobium or an alloy thereof.

A particular advantage provided by the coatings of the present invention is anticorrosive protection. Furthermore, an anticorrosive coating made from a composition comprising the polyaniline salt avoids the problem of environmental hazard resulting from use of lead or chromium commonly used in corrosion inhibitors.

The polyaniline salt prepared by the present invention can also be used in a composite with a thermosetting or thermoplastic resin. Any of the methods known in the art can be used to form the composite. For example, the polyaniline salt can be admixed to a second polymer.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples.

EXAMPLE 1

The following example illustrates the preparation of the dinonylnaphthalenesulfonic acid salt of polyaniline by the emulsion-polymerization process using 2-butoxyethanol as the water-soluble organic emulsion solvent.

A solution containing 0.1 moles (46.1 g) of dinonylnaphthalenesulfonic acid dissolved in 2-butoxyethanol at a concentration of 50% (w/w %) was mixed with 0.06 moles (5.5 ml) aniline and 200 ml water. The milky-white emulsion thus formed was mechanically stirred, cooled to 5° C. and blanketed with nitrogen. Ammonium persulfate, $7.4\times10^{-2}$ moles (17.0 g) in 40 ml of water, was added dropwise to the mixture over a period of approximately one hour. During this period the solution changed color from white to amber. The reaction was allowed to proceed overnight for 17 hours. The color of the emulsion at this time had become green. The contents of the reactor, were transferred to a beaker at which time the emulsion separated into an upper oily green phase containing the polyaniline and a lower colorless aqueous phase. The lower aqueous phase was removed with a pipette and 100 ml water was added to the green phase. At this point the green polyaniline phase became the lower phase and the colorless clear aqueous phase became the upper phase. The aqueous phase was decanted and the green polyaniline phase was subsequently washed with two 100 ml portions of water. The polyaniline phase thus obtained appeared uniform to the naked eye and the polymer remained solubilized in the organic phase.

Using the same process, polyaniline salts of dinonylnaphthalenesulfonic acid were also prepared in which the starting mole ratios of acid to aniline were 1:1 and 1:2. This was done by comparably increasing the amount of both aniline and radical initiator in the reaction mixture without changing the additional elements of the reaction mixture. Thus, in preparing the polyaniline salt from a mixture having an acid to aniline mole ratio of 1:2, 0.1 moles of dinonylnaphthalenesulfonic acid, 0.2 moles of aniline, and 0.25 moles of ammonium persulfate were used.

EXAMPLE 2

The following example illustrates the preparation of the dinonylnaphthalenesulfonic acid salt of polyaniline by the emulsion-polymerization process using propylene glycol butyl ether as the water-soluble organic emulsion solvent.

An emulsion was prepared by combining 0.076 moles (34.83 g) of dlinonylnaphthalenesulfonic acid with 34.83 grams of propylene glycol butyl ether, 0.045 moles (4.1 ml) aniline and 200 ml water. This was mechanically stirred, cooled to 5° C. and blanketed with nitrogen. Ammonium persulfate, $5.55\times10^{-2}$ moles (12.66 g) in 40 ml water was added dropwise to the mixture over a period of approximately 40 minutes. The emulsion became brown in color. Approximately 2 hours later two phases formed and the organic phase was greenish-blue in color.

A sample of the mixture was removed and the phases were allowed to separate. A clear green film was formed on drying.

The bulk of the material was transferred from the reaction vessel for storage overnight. Green material from the organic phase remained in the reaction vessel and this was found to be readily soluble in propylene glycol butyl ether. The material stored overnight developed a darker green color after the storage. The aqueous layer was removed and the organic layer washed with 200 ml of water.

EXAMPLE 3

The following example illustrates the requirement for a water-soluble organic solvent by lack of polymerization of the dinonylnaphthalenesulfonic acid salt of polyaniline from a xylene-water emulsion.

A solution containing 0.1 moles (46.2 g) of dinonylnaphthalenesulfonic acid in 50% (w/w) xylene was mixed with 0.06 moles (5.5 ml) aniline and 200 ml water. The brown emulsion was mechanically stirred, cooled to 8° C. and blanketed with nitrogen. Ammonium persulfate, $7.4 \times 10^{-2}$ moles (17.0 g) in 40 ml of water was added dropwise to the mixture over a period of approximately one hour. A two phase mixture formed in which the upper organic phase was brown and the lower aqueous phase was colorless. The reaction mixture failed to change to a green color and this indicated that no polyaniline was formed. By the next morning, approximately 19 hours later, no noticeable green color was observed indicating absence of polyaniline formation.

Benzylcetyldimethyl ammonium chloride (1.188 g) was added to the mixture in an attempt to more readily facilitate transference or partitioning of the ammonium persulfate into the xylene phase. Five hours later, no noticeable green color was observed indicating absence of polyaniline formation.

A small portion of the aqueous phase was removed and tested for the presence of ammonium persulfate by addition of a few drops of aniline. A dark green color immediately appeared indicating oxidation by the ammonium persulfate.

Thus the ammonium persulfate was in the aqueous phase, whereas the aniline had apparently partitioned into the xylene phase such that no polymerization could occur.

EXAMPLE 4

The following example illustrates the preparation of the p-toluene sulfonic acid salt of polyaniline by the emulsion-polymerization process using 2-butoxyethanol as the water-soluble organic emulsion solvent.

A 100 ml volume of a solution containing 0.1 moles of p-toluene sulfonic acid in 2-butoxyethanol was mixed with 0.06 moles (5.5 ml) aniline and 200 ml water. The milky-white emulsion was mechanically stirred, cooled to 5° C. and blanketed with nitrogen. Ammonium persulfate, $7.4 \times 10^{-2}$ moles (17.0 g) in 40 ml of water, was added dropwise to the mixture over a period of approximately 25 minutes. The reaction was allowed to proceed for overnight for approximately 17 hours at which time a green precipitate was formed. The precipitate was separated from the reaction mixture and washed three times with 100 ml water. The reaction product formed from p-toluene sulfonic acid and aniline polymerization thus differed from the polymer in example 1 which remained soluble in the organic solvent.

EXAMPLE 5

The following example illustrates the preparation of the dodecylbenzenesulfonic acid salt of polyaniline by the emulsion-polymerization process using isopropanol as the water-soluble organic emulsion solvent.

A solution containing 0.1 moles (32.6 g) of dodecylbenzenesulfonic acid in 70% (w/w) isopropanol was mixed with 0.06 moles (5.5 ml) aniline and 200 ml water. The milky-white emulsion thus formed was mechanically stirred, cooled to 5° C. and blanketed with nitrogen. Ammonium persulfate, $7.4 \times 10^{-2}$ moles (17.0 g) in 40 ml of water, was added dropwise to the mixture over a period of approximately 4 hours. The reaction was allowed to proceed overnight for approximately 17 hours. Addition of acetone resulted in precipitation of the polyaniline salt.

EXAMPLE 6

The following example illustrates the preparation of the dodecylbenzenesulfonic acid salt of polyaniline by the emulsion-polymerization process using 2-butoxyethanol as the water-soluble organic emulsion solvent.

A solution was prepared by mixing 0.1 moles (32.6 g) of dodecylbenzenesulfonic acid with 100 ml of 2-butoxyethanol, 0.06 moles (5.5 ml) of aniline and 200 ml water. The mixture formed a solution with no noticeable emulsion and this was mechanically stirred, cooled to 5° C. and blanketed with nitrogen. Ammonium persulfate $7.4 \times 10^{-2}$ moles (17 g) in 40 ml of water, was added dropwise to the mixture over a period of 30 minutes. The solution became blue within 5 minutes and after 3 hours, a green micro-dispersion had formed.

EXAMPLE 7

The following example illustrates the preparation of the dinonylnaphthalenedisulfonic acid salt of polyaniline by the emulsion-polymerization process using isobutanol as the water-soluble organic emulsion solvent.

A solution containing 0.1 moles (54.1 g) of dinonylnaphthalenedisulfonic acid in 55% (w/w) isobutanol was mixed with 0.06 moles (5.5 ml) aniline and 200 ml water. The milky-white emulsion was mechanically stirred, cooled to 5° C. and blanketed with nitrogen. Ammonium persulfate, $7.4 \times 10^{-2}$ moles (17.0 g) in 40 ml of water, was added dropwise to the mixture over a 75 minute period. The reaction was allowed to proceed overnight for 17 hours at which time a green precipitate was formed. The precipitate was separated from the reaction mixture and washed three times with 100 ml water.

EXAMPLE 8

The following example illustrates the relationship of the water solubilities of various organic solvents compared to their effectiveness in the emulsion-polymerization of the polyaniline salt of dinonylnaphthalenesulfonic acid.

0.01 moles (4.6 g) of dinonylnaphthalenesulfonic acid, 0.006 moles (0.56 g) of aniline, and 0.0074 moles (8.5 g) of ammonium peroxydisulfate were combined with 4.6 grams of the organic solvent and 20 ml water according to the method in example 1. A number of organic solvents were evaluated for their effectiveness in the emulsion-polymerization of the polyaniline salt of dinonylnaphthalenesulfonic acid (PANI). Results are shown in Table 1.

As seen in the table, the organic solvents acetonitrile, N,N-dimethylacetamide, tetrahydrofuran, and dimethylsulfoxide all produced a phase separation with formation of a precipitate. No polyaniline salt was formed with these solvents. Among the other organic solvents tested, those in which water was soluble at about 6% (w/w) or greater were effective in polymerizing the polyaniline salt. The polyaniline produced with the organic solvent, 2-propanol precipitated from the reaction mixture whereas, that produced by 1-butanol, 1-hexanol and diethyl ether remained solubilized in the organic phase of the reaction mixture and yielded polymers of molecular weight (MW) greater than 11,000 as determined by gel permeation chromatography.

In contrast the results with organic solvents in which water was soluble at 6% or greater, those organic solvents in which water was soluble at about 0.99% or less, i.e. 1-nonanol, 1-octanol, chloroform and chlorobenzene, did not produce polyaniline.

TABLE 1

| Organic Solvent | Reaction Time | Sol. in H$_2$O (w/w %) | H$_2$O Sol. in Solvent (w/w %) | Results |
|---|---|---|---|---|
| 2-Propanol | 20 hrs. | 100% | 100% | Insol. PANI |
| Acetonitrile | 20 hrs. | 100% | 100% | Phase Sep.-ppt. |
| DMAC[a] | 3 days | 100% | 100% | Phase Sep.-ppt. |
| DMSO[b] | 20 hrs. | 100% | 100% | Phase Sep.-ppt. |
| THF[c] | 20 hrs. | 100% | 100% | Phase Sep.-ppt. |
| 1-Butanol | 22 hrs. | 7.8% | 20.1% | sol. PANI |
| 1-Hexanol | 19 hrs. | 0.58% | 7.2% | sol. PANI |
| Diethylether | 20 hrs. | 0.9% | 6% | sol. PANI |
| 1-Nonanol | 3 days | 0.06% | 0.99% | No Reaction |
| 1-Octanol | 20 hrs. | 0.06% | 0.25% | No Reaction |
| Chloroform | 20 hrs. | 0.82% | 0.06% | No Reaction |
| chlorobenzene | 10 hrs. | — | — | No reaction |

[a]dimethylacetamide
[b]dimethylsulfoxide
[c]tetrahydrofuran

EXAMPLE 9

This example illustrates the further preparation of the composition of the polyaniline salt of dinonylnaphthalenesulfonic acid in organic polymerization solvent and in the carrier solvent, xylene.

The polyaniline salt of dinonylnaphthalenesulfonic acid was prepared as described in example 1 using a mole ratio of approximately 1:0.6 (organic acid to aniline) by combining 1033.28 g water, 471 grams Nacure® 1051 (King Industries, Norwalk, Conn.) which contained 235.5 g dinonylnaphthalenesulfonic acid (0.511 moles) and 235.5 g 2-butoxyethanol (1.994 moles), 28.67 g aniline (0.308 moles), and 86.7 g ammonium persulfate (0.380 moles) in 191 ml water. The reaction was run at 6°–7° C. with the reaction mixture blanketed with air for 24 hours.

The polyaniline salt thus formed was further processed as follows. 1070 g of xylenes (Fischer Scientific,. St. Louis, Mo.) was added to the reaction mixture and mixed for 1 minute. The lower aqueous phase was then drained and 715 ml of 0.01M H$_2$SO$_4$ was added to the organic phase and mixed for 1 minute. The acid wash formed a lower aqueous phase which was drained. A 715 ml water wash was then added to the organic phase, mixed for 1 minute. The water wash was then drained. The remaining organic phase was then concentrated in a rotary evaporator using a water tap aspirator and a maximum evaporator temperature of 58° C. to distill off water and xylenes. Approximately 900–950 ml xylenes was evaporated.

Three batches prepared as described above were combined. Analysis by gas chromatography (GC) indicated that the pooled sample contained 40.8 wt. % xylenes and 20.7 wt. % 2-butoxyethanol. The polyaniline salt content was estimated by determining the solids content of the composition. Drying of an aliquot of the pooled sample at 127° C. under a vacuum of 25 inches Hg (609.6 mm Hg) for 16.25 hours gave a value of 48.4% as the percent of remaining solids.

Because an excess of dinonylnaphthalenesulfonic acid was used, the solids contain unreacted acid in addition to the polyaniline salt. Assuming that the reaction completely polymerized all of the aniline, the amount of reacted acid plus aniline divided by the total amount of acid plus aniline gives a value of 0.65 for the fraction of the remaining solids that constitute polyaniline salt. Thus, a maximum of 31% of the remaining solids can be polyaniline salt.

The mole ratio of xylenes to 2-butoxyethanol was also determined using nuclear magnetic resonance ($^1$H-NMR) with 300 MHz spectrometer and CDCl$_3$ as the NMR solvent. The NMR for 2-butoxyethanol was identified by peaks related to three —CH$_2$—O— groups and xylenes were identified by peaks associated with methyl groups. From the areas under the peaks, the mole ratio between 2-butoxyethanol and xylenes was calculated and from this the weight ratio was calculated by multiplying by the molecular weight. The weight ratio of 2.41/1 was thus obtained which compares favorably with the weight ratio obtained from the GC method above of 1.97/1 (40.8%/20.7%).

Using diethylether as the organic polymerization solvent, prepared according to example 8 and further processing with xylene followed by washing and vacuum evaporation as above, the NMR analysis revealed no detectable presence of diethyl ether in the xylene-based solution of polyaniline salt. Thus, the amount of organic polymerization solvent remaining in the xylene-based solution of polyaniline salt ranged from about 0% organic polymerization solvent as in the case of diethyl ether to about 25% to about 35% organic polymerization solvent as in the case of 2-butoxyethanol.

EXAMPLE 10

The following example illustrates template synthesis using the copolymer of tetrafluoroethylene and perfluoro 3,6-dioxa-4-methyl-7-octene sulfonylfluoride in the hydrolyzed H$^+$ form in the emulsion-polymerization process with 2-butoxyethanol as the water-soluble organic emulsion solvent.

A solution was formed by dissolving in 90 grams of 2-butoxyethanol, 100 grams of a 10% solution (w/w) (9.1× 10$^{-3}$ equivalents) the copolymer of tetrafluoroethylene and perfluoro 3,6-dioxa-4-methyl-7-octene sulfonylfluoride in the hydrolyzed H$^+$ form having an equivalent weight of 1100. This material is sold under the trademark "Nafion®" (E.I. DuPont DeNemours & Company). The compound has the structure $[CF_2CF_2)_m$—$(CF_2CF)]_n[O$—$CF_2CF(CF_3)]_z$—$O$—$CF_2CF_2SO_3H$ where m=approximately 6.5 and z=1. This material was obtained from Solution Technologies, Inc. The original solvent system consisting of low molecular weight alcohols was stripped off using a rotating evaporator at 70° C. A cloudy suspension of the material in 2-butoxyethanol resulted.

An additional 18.3 g of 2-butoxyethanol was added along with 0.5 ml (5.46×10$^{-3}$ moles) of aniline. The mixture was mechanically stirred, cooled to 3°–40° C. and blanketed with nitrogen. After approximately one hour, 100 ml of water was added to the mixture which had developed a light blue-green color. Ammonium persulfate (1.5 g in 20 ml water) was added to the reaction mixture dropwise over a period of 5 minutes. The reaction was allowed to proceed overnight for 18 hours. A dark green solution had formed at this time.

The resultant polyaniline complex precipitated when excess water was added to a small portion of the reaction mixture indicating that the complex was insoluble in water.

EXAMPLE 11

The following example illustrates the preparation of the dinonylnaphthalenesulfonic acid salt of polyaniline by dedoping the commercially-obtained polyaniline salt with a protonic acid dopant and redoping with dinonylnaphthalenesulfonic acid in 2-butoxyethanol.

The polyaniline salt of a protonic acid dopant sold under the trademark "Versicon®" (Allied-Signal Inc., Buffalo, N.Y.) was used and this is referenced hereinafter as C-PANI. The C-PANI was de-doped with ammonium hydroxide and redoped with dinonylnaphthalenesulfonic acid as follows.

C-PANI, 31.53 grams, was mixed with 1 liter of three weight percent of ammonium hydroxide in water and stirred for 2 hours. The material was then filtered and washed successively with three 100 ml volumes of deionized water, three 100 ml volumes of methanol, and three 100 ml volumes of diethylether. The C-PANI base material was then air dried at room temperature. The material was redoped with dinonylnaphthalenesulfonic acid in 2-butoxyethanol to give a molecular ratio of acid to aniline monomer of 1:2. This was done by mixing 46.12 grams of a 50% solution of dinonylnaphthalenesulfonic acid in 2-butoxyethanol with 46.49 grams of C-PANI base to form a slurry. An additional 100 ml of 2butoxyethanol was added to the slurry and the slurry was transferred to a roller mill jar having ½ inch×½ inch cylinders and containing ceramic grinding media. The slurry was milled on a Fischer Scientific Co. Model 755RMV roller mill to facilitate dispersion and doping of the polymer. After milling overnight the polymer appeared to be dispersed and green in color indicating formation of the conducting emeraldine salt. The concentration of polymer in the dispersion was determined to be 22.16% by drying a portion of the dispersion and weighing the remaining polymer.

EXAMPLE 12

This example illustrates the solubility in various carrier organic solvents for the dinonylnaphthalenesulfonic acid salt of polyaniline.

The polyaniline salt was prepared as in example 1 from a 1:2 mole ratio of aniline to dinonylnaphthalenesulfonic acid (DNNSA (1:2)). A 10 to 100 mg sample of the composition of 60% polyaniline salt in 2-butoxyethanol was mixed with a test solvent (0.5 to 1.5 grams). Solubility was determined immediately after preparation. In testing solubility in xylene, 2.12 grams of the composition of 60% polyaniline salt in 2-butoxyethanol was mixed with 37.64 grams of xylene. The polyaniline is reported in the table to be insoluble in acetone and water on the basis of these solvents being used to precipitate and wash the polyaniline from the organic emulsion phase. The rating of solubility was S, solubility equal to or greater than 1% by weight; SS, solubility less than 1% by weight and greater than about 0%; and I, insoluble (approximately 0% soluble). The Hansen solubility parameter was taken from Frulke (*Polymer Handbook*, 3d Ed., Brandrup and Immergut, Eds., Wiley & Sons, New York, pp. 519–517, 1989).

Table 2 shows that the polyaniline salt composition is soluble at concentrations greater than 1% by weight in organic solvents having a dielectric constant less than about 17.

TABLE 2

| Solvent | DNNSA (1:2) (mg) | DNNSA (1:2) plus Solvent (g) | Solubility[a] | Dielectric Constant | Hansen Solubility Parameter |
|---|---|---|---|---|---|
| hexanes | 39.8 | 0.858 | S | 1.9 | 14.9 |
| cyclohexane | 85.6 | 0.984 | S | 2.0 | 16.8 |
| xylene | 2120 | 37.64 | S | 2.4 | 18.0 |
| 1,4 dioxane | 48.2 | 1.035 | S | 2.2 | 20.5 |
| trichloro ethylene | 16.8 | 1.005 | S | 3.4 | 18.8 |
| chloroform | 46.2 | 1.314 | S | 4.8 | 19.0 |
| butylacetate | 57.4 | 0.992 | S | 5.1 | 17.4 |
| n-decyl alcohol | 41.5 | 0.658 | S[d] | 7.9 | — |
| 2-butoxy ethanol | 45.6 | 0.819 | S[d] | 9.4 | — |
| 1-octanol | 90.1 | 0.869 | S[d] | 10.3 | 21.1 |
| m-cresol | 33.8 | 0.697 | S | 12.4 | 20.9 |
| 4-methyl-2-pentanone | 46.6 | 0.607 | S | 13.1 | 17.2 |
| 1-pentanol | 29.0 | 0.881 | S | 15.1 | — |
| 1-butanol | 38.3 | 0.927 | S[d] | 17.8 | 23.3 |
| methylethyl ketone | 33.2 | 0.901 | S | 18.6 | 19.0 |
| 2-methoxy ethanol | 42.8 | 1.190 | SS | 17.2 | — |
| isopropanol | 44.6 | 0.770 | SS | 20.1 | 23.5 |
| acetone | — | — | I | 21.0 | 20.3 |
| N-methyl-2-pyrrolidinone | 54.4 | 1.201 | S | 32.2 | 23.1 |
| acetonitrile[c] | 60.2 | 0.813 | SS | 36.6 | 24.3 |
| N,N dimethyl formamide | 61.9 | 1.046 | S | 38.2 | 24.8 |
| dimethyl sulfoxide | 80.1 | 0.838 | SS | 47.2 | 24.6 |
| water | — | — | I | 80.1 | 47.9 |
| Acrilan/DMF | 624 | 8.802 | S | — | — |
| dipropylene glycol methyl ether acetate | 46.7 | 0.951 | S[d] | — | — |
| diprophylene glycol butyl ether | 35.1 | 0.765 | S[d] | — | — |
| propylene glycol butyl ether | 47.6 | 0.682 | S[d] | — | — |
| proylene glycol methyl ether acetate | 21.4 | 1.007 | S[d] | — | — |
| Arcosolv PNB | 82.1 | 1.008 | S[d] | — | — |
| tripropylene glycol methyl ether[b] | 30.5 | 0.870 | S | — | 17.8 |
| diethylene glycol mono butyl ether | 37.2 | 0.732 | S[d] | — | 19.4 |
| diethylene glycol | 68.2 | 0.774 | I | — | 18.0 |
| diethylene glycol mono ethyl ether | 29.9 | 0.850 | SS | — | 20.9 |
| propylene carbonate | 44.0 | 1.247 | I | — | 27.2 |

[a]Solubility was rated as S, solubility equal to or greater than 1% by weight; SS, solubility less than 1% by weight and greater than about 0%; and I, insoluble (approximately 0% soluble).
[b]Solution changed color to blue.
[c]Solution changed color to brown.
[d]Polymer phase settled 24 hours after preparation.

EXAMPLE 13

The following example compares the ultrafiltration of the polyaniline salt of dinonylnaphthalenesulfonic acid prepared by the emulsion-polymerization process in example 1 with that of the polyaniline salt of dinonylnaphthalenesulfonic acid prepared by the neutralizing and redoping process in example 11.

After soaking the polymer for over 4 months, 4.2746 grams of the material prepared in example 11 was added to 25 ml xylene. Some, but not all of the material dissolved. A portion of the solution containing dissolved polyaniline salt was dried and weighed and the actual concentration of the solution was determined to be 2.7%. A 10 ml portion of the solution was transferred to a 10 ml syringe equipped with a 0.2 micron filter (Fluoropore PTFE, Sigma Chemical Co.). After 0.48 grams of the solution passed through the filter, the filter became clogged and no more material could be filtered. The filtered solution was dried and weighed and the concentration of polyaniline in the filtrate was determined to be 2.34%. This amounted to a 12% loss of dissolved material. Additional filtration attempts using 0.5 and 1.0 micron filters resulted in immediate clogging of the filters which indicated that particles greater than 1 micron were present in the material.

A 2.12 gram sample of solution containing 60 weight percent of the polyaniline salt of dinonylnaphthalenesulfonic acid in 2-butoxyethanol was prepared according example 1 using a 1:2 mole ratio of acid to aniline. This was dissolved in 25 ml xylene to give a concentration of 4.99 weight percent. A 10 ml portion of the solution was transferred to a 10 ml syringe equipped with a 0.2 micron filter as above. The entire 10 ml easily passed through the 0.2 micron filter without clogging and the filtrate was found to have a concentration of polyaniline salt amounting to 4.83%. The decrease in concentration compared to unfiltered solution was 3.2%.

It was concluded that the C-PANI that was dedoped and redoped with dinonylnaphthalenesulfonic acid contained at least 12.2% of the material in the form of particles having a diameter of greater than 0.2 microns. By way of comparison, only 3.2% of the polyaniline salt of dinonylnaphthalenesulfonic acid prepared by emulsion-polymerization did not pass through the filter and, therefore, at least 96.8% of this material contains no particles having a diameter greater than 0.2 microns.

EXAMPLE 14

This example illustrates the optical micrographs of the polyaniline salt of dinonylnaphthalenesulfonic acid produced by emulsion-polymerization according to example 1 compared to that of the C-PANI doped with dinonylnaphthalenesulfonic acid as in example 10.

The polyaniline salt of dinonylnaphthalenesulfonic acid made from commercially-obtained C-PANI was prepared as in example 10 by neutralized and redoped with dinonylnaphthalenesulfonic acid. A small amount of C-PANI-derived material was placed in xylene, spread on a microscope slide and covered with a cover slip. After drying, particles having a diameter of approximately 25 microns were observed under the light microscope at a power of 80× (FIG. 1A). The observed particles were similar in size to the 50 $\mu$m diameter particles reported for Versicor®. (Shacklette et al. *Synth Met* 57:3532–7, 1993).

A small amount of the polyaniline salt in the organic phase from example 1 using a 1:2 mole ratio of acid to aniline was dissolved in xylene and spread on a microscope slide. A cover slip was then placed over the solution. No particles were apparent on observation under a light microscope under a power of 800×. On drying, particles were still not apparent under the light microscope at a power of 800× (FIG. 1B). This indicated that the emulsion-polymerization process produced no polyaniline particles having a diameter greater than approximately 0.5 microns, the limit of resolution of the optical microscope.

EXAMPLE 15

This example illustrates the environmental scanning electron micrographs of the polyaniline salt of dinonylnaphthalenesulfonic acid prepared by emulsion-polymerization according to example 1 compared to commercially-obtained C-PANI doped with dinonylnaphthalenesulfonic acid according to Example 11.

The ElectroScan Environmental Scanning Electron Microscope from Electroscan Corporation (Wilmington, Mass.) was used. Pressure in the specimen chamber was maintained at approximately 10 Torr.

Figure 2:
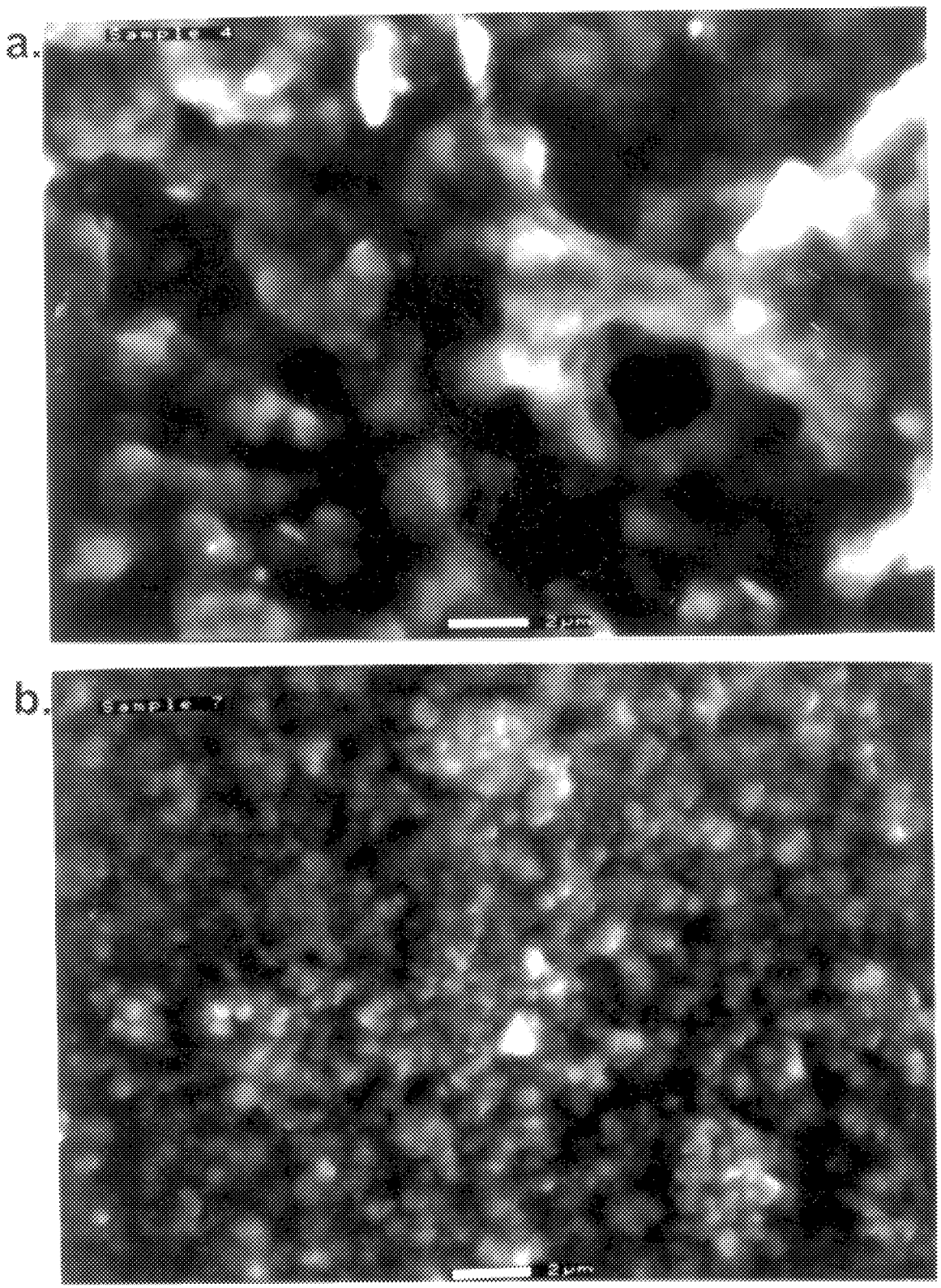
FIG. 2 consists of environmental scanning electron micrographs at approximately 7000× magnification showing (a) the unevenly dispersed, globular nature of the sample of polyaniline salt of dinonylnaphthalenesulfonic acid prepared by neutralizing and redoping a commercially-obtained polyaniline salt and (b) the more evenly dispersed nature of the sample of polyaniline salt of dinonylnaphthalenesulfonic acid prepared by emulsion-polymerization according to this invention.

A small amount of the C-PANI-derived polyaniline salt of dinonylnaphthalenesulfonic acid prepared according to example 10 was placed on the specimen platform. An electron micrograph was obtained at an approximate magnification of 7000×. The micrograph showed the material to be dense and unevenly dispersed containing globules of 2 $\mu$m and greater in diameter with some apparent bridging between globules (FIG. 2A).

A small amount of the polyaniline salt of dinonylnaphthalenesulfonic acid in the organic phase from the emulsion-polymerization process of example 1 using a 1:2 mole ratio of acid to aniline was placed on the specimen platform. At a magnification of 7000×, the material appeared finer and less dense and more uniformly dispersed than the C-PANI-derived material (FIG. 2B). What appeared to be polymer-solvent domains were present having a diameter less than approximately 0.5 $\mu$m.

EXAMPLE 16

This example illustrates coating of a glass substrate with the polyaniline salt of dinonylnaphthalenesulfonic acid prepared by the emulsion-polymerization process.

A small portion of the green polyaniline phase containing the polyaniline salt of dinonylnaphthalenesulfonic acid prepared in example 1 using an acid to aniline mole ratio of 1:0.6 was removed with a stirring rod and coated onto a microscope slide. The coated slide was then placed in an oven at 105° C. under a nitrogen atmosphere at a reduced pressure of 20 inches of Hg. Drying was allowed to proceed overnight.

The coating was hydrophobic, which was indicated by the beading of water added to the surface. Visual inspection of the film under an optical microscope revealed a homogenous film with no particles apparent. Thus the composition contains no particles having a diameter of 0.5 microns or greater which is the limit of resolution of the optical microscope.

The conductivity of the film was measured by contacting the leads of an ohmmeter to the film at a distance of approximately 1 cm between the electrodes and resistance values in the range of from approximately 50 to 230 kiloohm were measured in different preparations of the coating.

EXAMPLE 17

This example illustrates the coating of a steel coupon with the polyaniline salt of dinonylnaphthalenesulfonic acid prepared by the emulsion-polymerization process.

A small portion of the green polyaniline phase containing the polyaniline salt of dinonylnaphthalenesulfonic acid prepared in example 1 using an acid to aniline mole ratio of 1:0.6 was removed with a stirring rod and coated onto a C1018 carbon steel coupon. The coated coupon was then dried overnight as described in example 13.

Water tended to bead on the surface of the coating which indicated that the coating was hydrophobic as was observed for the film in example 15. In addition, the film had an adhesion rating of 4 on a scale of 0 to 5 using the cross cut tape test according to ASTM D 3359 (*Annual Book: of ASTM Standards*, Vol. 6.01, 1992, pp. 447–450).

EXAMPLE 18

This example illustrates conductivity of the polyaniline salts measured in pellets formed from the powdered material.

The conductivity of polyaniline salts prepared by emulsion-polymerization was determined and compared to that of polyaniline salts prepared by aqueous polymerization or obtained commercially in commercial form or doped with acid. The dry form of the polyaniline salts of dinonylnaphthalenesulfonic acid (DNNSA, 1:0.6; DNNSA, 1:1, DNNSA 1:2), dodecylbenzenesulfonic acid (DDBSA) and dinonylnaphthalenedisulfonic acid (DNNDSA) was prepared as in examples 1, 5 and 7, respectively, and dried for approximately 24 hours in an oven at 105° C. under a nitrogen atmosphere at a reduced pressure of 20 inches of Hg.

The polyaniline salt p-toluene sulfonic acid (PTSA-AP) was prepared by aqueous-solution polymerization according to example 1 in PCT Application No. WO 92/11645 by Han et al. Briefly, this involved adding to an aqueous solution of aniline and p-toluene sulfonic acid, ammonium persulfate in aqueous solution at 15° C. over 40 min and then allowing the reaction to continue for 0.5 hours. The resultant precipitate was washed with an aqueous toluene sulfonic acid solution followed by a methanol wash. The precipitate was then dried as indicated above.

The polyaniline salt of a protonic acid dopant, C-PANI, was obtained commercially. The dinonylnaphthalenesulfonic acid salt of C-PANI (DNNSA C-PANI) was prepared by neutralizing the C-PANI with aqueous ammonium hydroxide and reprotonation with dinonylnaphthalenesulfonic acid according to the method of Cao et al. (Cao, Y., Addreatta, Heegert, A. J., and Smith, P., *Polymer* 30:2304–3211, 1989).

The polyaniline salts in the dry powder form were compressed into pellets using a 13 mm diameter Macro-Micro KBR die and a 12-ton laboratory hydraulic press. The powder was placed in the die and a pressure of 2000 lbs was applied. Each pellet thus formed was measured to determine its diameter and thickness. The pellets were in the shape of disks. In measuring the conductivity a pellet was sandwiched between two copper contact pads having the same cross sectional area and the resistance was measured using an ohmmeter. Lead resistances were 0.67 Ohms for DNNSA, 0.848 Ohms for DNNSA (C-PANI), 0.313 Ohms for DNNDSA and 0.735 Ohms for DDBSA, PTSA-AP and C-PANI. Conductivity was calculated using the following formula:

$$\text{Conductivity} = (\text{Thickness})/(\text{resistance} \times \text{area}) = d/(RA)$$

Results of conductivity measurements are shown in Table 3.

TABLE 3

| Polyaniline Salt | Thickness (mm) | Diameter (cm) | Resistance (Ohms) | Conductivity (S/cm) |
|---|---|---|---|---|
| DNNSA (1:0.6) | 2.761 | 1.29 | 250.00 | 8.46 E-04 |
| DNNSA (1:1) | 2.221 | 1.29 | 205.00 | 8.79 E-04 |
| DNNSA (1:2) | 0.872 | 1.29 | 6.21 | 2.29 E-02 |
| DNNSA (C-PANI) | 1.771 | 1.29 | 37,900.00 | 3.57 E-06 |
| DNNDSA | 2.595 | 1.29 | 24,700.00 | 8.05 E-06 |
| DDBSA | 1.193 | 1.28 | 5.19 | 2.08 E-02 |
| PTSA-AP | 1.254 | 1.28 | 1.53 | 1.23 E-01 |
| C-PANI | 1.026 | 1.29 | 3.60 | 2.74 E-02 |

The DNNSA prepared by the emulsion polymerization process had a conductivity value approximately 200 times greater than that of the DNNSA (C-PANI) prepared by doping the neutralized C-PANI with the dinonylnaphthalenesulfonic acid. The lower value for the DNNSA (C-PANI) suggests that the polyaniline may not have been fully doped with the acid.

EXAMPLE 19

In this example, the molecular weight averages were determined for polyaniline salts prepared by the emulsion-polymerization process.

Molecular weight analyses were performed using size exclusion chromatography for the polyaniline salts prepared in examples 1, 4 and 5. These were the polyaniline salts of dinonylnaphthalenesulfonic acid (DNNSA (1:0.6)), p-toluene sulfonic acid (PTSA (1:0.6)), and dodecylbenzenesulfonic acid (DDBSA (1:0.6)). As indicated in parentheses, these were prepared using acid and aniline at a mole ratio of 1:0.6. In addition, the molecular weight averages were obtained for C-PANI. The polyaniline salts were first converted to the nonconductive form by dissolving at a concentration of 5 mg/ml in n-methylpyrroline saturated with ammonium formate. A small amount of each polymer was insoluble in the n-methylpyrroline saturated with ammonium formate. The insoluble materials were centrifuged and the supernatant solution was used in the molecular weight analyses.

Size exclusion chromatography was performed using $10^2$, $10^3$, and $10^4$ ngstrom mean permeability styragel columns equilibrated with n-methylpyrroline saturated with ammonium formate. Temperature was maintained at 45° C. and flow rate was 0.5 ml/min. Fourteen polystyrene calibration standards were used ranging from $1.1 \times 10^6$ to 500 molecular weight. Number average ($M_n$), weight average ($M_w$) and z-average ($M_z$) molecular weight averages were determined relative to the polystyrene standards. Values shown in Table 4 represent the means of two determinations performed on the soluble fraction of each sample.

TABLE 4

| Polyaniline | $M_n$ | $M_w$ | $M_z$ | $M_w/M_n$ |
|---|---|---|---|---|
| DNNSA (1:0.6) | 16,157 | 25,549 | 37,818 | 1.58 |
| PTSA (1:0.6) | 11,798 | 25,459 | 55,748 | 2.16 |
| DDBSA (1:0.6) | 19,908 | 41,081 | 73,428 | 2.06 |
| C-PANI | 2,931 | 4,708 | — | 1.61 |

In general, the polyaniline salts tested produced broad size exclusion chromatograms. The sulfonic acid components separated from the polyaniline peaks and were not included in the molecular weight calculations.

The ratio of $M_w/M_n$ provides an estimate of the molecular weight distribution. The value obtained for dinonylnaphthalenesulfonic acid was 1.58 which is comparable to the value of 1.61 obtained for C-PANI but smaller than the value obtained for p-toluene sulfonic acid or dodecylbenzenesulfonic acid. This indicated that the polyaniline salt of dinonylnaphthalenesulfonic acid has a narrower range of molecular weight distributions than the polyaniline salts of p-toluene sulfonic acid or dodecylbenzenesulfonic acid.

EXAMPLE 20

This example illustrates the thermal analysis of polyaniline salts.

Analyses were performed by the simultaneous differential thermal analysis and thermogravimetric analysis technique using an Omnitherm STA 1500. Polyaniline salts prepared according to examples 1 (DNNSA, 1:0.6), 4 (PTSA), 5 (DDBSA) and 7 (DNNDSA) were evaluated. These were found to be stable up to 200° C. which is consistent with values obtained for the commercially available polyaniline salt composition, C-PANI.

EXAMPLE 21

The following example illustrates the elemental analysis of the polyaniline salts of the protonic acids prepared by emulsion-polymerization.

The elemental analysis was performed by Galbraith Laboratories Inc., Knoxville, Tenn. Determinations of carbon, hydrogen and nitrogen used ASTM D5291 method A (*Annual Book of ASTM Standards,* Vol. 5.03, 1993, pp. 460–4); Sulfur determinations used ASTM D4239 (*Annual Book of ASTM Standards,* Vol. 5.05, pp. 392–400); and oxygen determinations used a Leco Model RO-478 Oxygen Determinator.

The results are shown in Table 5 for the polyaniline salts of dinonylnaphthalenesulfonic acid (DNNSA (1:0.6), example 1, 1:0.6 acid to aniline mole ratio, 2-butoxyethanol solvent; DNNSA (1:1), example 1, 1:1 acid to aniline mole ratio, 2-butoxyethanol solvent; DNNSA (1:2), example 1, 1:2 acid to aniline mole ratio, 2-butoxyethanol solvent), dinonylnaphthalenedisulfonic acid (DNNDSA (1:0.6), example 7, 1:0.6 acid to aniline mole ratio, isobutanol solvent), dodecylbenzenesulfonic acid (DDBSA (1:0.6), example 5, 1:0.6 acid to aniline mole ratio, isopropanol solvent), and p-toluene sulfonic acid (PTSA (1:0.6) example 4, 1:0.6 acid to aniline mole ratio, 2-butoxybutanol solvent), and for commercially obtained polyaniline salt of a protonic acid (C-PANI) and commercially obtained polyaniline salt of a protonic acid doped with dinonylnaphthalenesulfonic acid (DNNSA (C-PANI), example 10, 1:2 acid to aniline monomer mole ratio). The DNNSA (1:0.6), DNNSA (1:1), C-PANI and PTSA (1:0.6) had measured values of % S/% N that were similar to expected values indicating approximately a 1:1 stoichiometry of cationic aniline monomers to anions of the acid. The measured values of % S/% N for DNNDSA (1:0.6) and DDBSA (1:0.6) exceeded the expected values which indicated that there is an excess of acid present. The measure value of % S/% N for the DNNSA (C-PANI) was less than the expected value. This indicated that the aniline was not fully doped with the acid.

TABLE 5

| Sample | Element | % Measured | % Expected |
|---|---|---|---|
| DNNSA (1:0.6) | C | 66.66 | 74.9 |
|  | H | 7.83 | 8.3 |
|  | N | 5.26 | 4.4 |
|  | S | 6.09 | 5.0 |
|  | O | 12.92 | 7.5 |
|  | % S/% N | 1.16 | 1.14 |
| DNNSA (1:1) | C | 68.46 | 74.9 |
|  | H | 7.97 | 8.3 |
|  | N | 5.34 | 4.4 |
|  | S | 5.56 | 5.0 |
|  | O | 12.18 | 7.5 |
|  | % S/% N | 1.04 | 1.14 |
| DNNSA (C-PANI) | C | 71.73 | 74.9 |
|  | H | 8.13 | 8.3 |
|  | N | 5.14 | 4.4 |
|  | S | 4.50 | 5.0 |
|  | O | 9.19 | 7.5 |
|  | % S/% N | 0.876 | 1.14 |
| DNNDSA (1:0.6) | C | 61.68 | 66.6 |
|  | H | 8.19 | 7.4 |
|  | N | 3.03 | 3.9 |
|  | S | 10.03 | 8.9 |
|  | O | 16.85 | 13.3 |
|  | % S/% N | 3.31 | 2.28 |
| DDBSA (1:0.6) | C | 60.87 | 72.4 |
|  | H | 8.30 | 5.8 |
|  | N | 2.92 | 5.6 |
|  | S | 9.47 | 6.4 |
|  | O | 17.83 | 9.7 |
|  | % S/% N | 3.24 | 1.14 |
| C-PANI | C | 63.65 | 64.6 |
|  | H | 6.62 | 4.8 |
|  | N | 6.58 | 7.9 |
|  | S | 8.00 | 9.1 |
|  | O | 15.20 | 13.6 |
|  | % S/% N | 1.22 | 1.15 |
| PTSA (1:0.6) | C | 63.24 | 64.6 |
|  | H | 5.44 | 4.8 |
|  | N | 8.09 | 7.9 |
|  | S | 7.94 | 9.1 |
|  | O | 15.00 | 13.6 |
|  | % S/% N | 0.98 | 1.15 |

In view of the above, it will be seen that the several advantages of the invention are achieved and other advantageous results attained.

As various changes could be made in the above methods and compositions without departing from the scope of the invention, it is intended that all matter contained in the above description and shown in the accompanying drawings shall be interpreted as illustrative and not in a limiting sense.

What is claimed is:

1. An emulsion process for producing a polyaniline salt comprising combining water, a water-solubilizing organic solvent capable of solubilizing water at a concentration of 6% w/w or greater, a water-insoluble organic acid that is soluble in said organic solvent, aniline and radical initiator wherein said polyaniline salt forms in solution in a liquid organic phase which spontaneously separates from an aqueous phase.

2. A process according to claim 1 wherein the water-solubilizing organic solvent is capable of solubilizing the polyaniline salt.

3. A process according to claim 2 wherein the water-solubilizing organic solvent has a dielectric constant less than about 17.

4. A process according to claim 3 wherein the water-solubilizing organic solvent is selected from the group consisting of 2-butoxyethanol, propylene glycol butyl ether, 1-butanol, 1-hexanol, diethyl ether, and mixtures thereof.

5. A process according to claim 4 wherein the water-insoluble organic acid is a sulfonic acid, a phosphorus-containing acid, a carboxylic acid, or mixtures thereof.

6. A process according to claim 5 wherein the water-insoluble organic acid is an organic sulfonic acid.

7. A process according to claim 6 wherein the organic sulfonic acid is dinonylnaphthalenesulfonic acid.

8. A process according to claim 4 wherein the water-insoluble organic acid is the copolymer of tetrafluoroethylene and perfluoro 3,,6-dioxa-4-methyl-7-octene sulfonylfluoride in the hydrolyzed H$^+$ form.

9. A process according to claim 4 wherein the aniline has the formula:

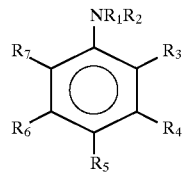

wherein $R_1$ and $R_2$ are, independently, hydrogen or alkyl; and $R_3$–$R_7$ are, independently, hydrogen, alkyl, arylalkyl, alkaryl, hydroxy, alkyloxy, halogen or nitro.

10. A process according to claim 9 wherein the radical initiator is ammonium persulfate.

* * * * *